(12) United States Patent
Spiegelberg et al.

(10) Patent No.: US 7,641,100 B2
(45) Date of Patent: Jan. 5, 2010

(54) COLD FORMED BATTERY TERMINAL

(75) Inventors: Bernard N. Spiegelberg, Mequon, WI (US); Terry J. Evraets, West Bend, WI (US)

(73) Assignee: Tulip Corporation, Milwaukee, WI (US)

( * ) Notice: Subject to any disclaimer, the term of this patent is extended or adjusted under 35 U.S.C. 154(b) by 734 days.

(21) Appl. No.: 11/268,497

(22) Filed: Nov. 8, 2005

(65) Prior Publication Data

US 2006/0046140 A1    Mar. 2, 2006

Related U.S. Application Data

(63) Continuation of application No. 10/162,059, filed on Jun. 4, 2002, now Pat. No. 7,163,763.

(51) Int. Cl.
*B23K 20/00* (2006.01)
*H01R 43/04* (2006.01)

(52) U.S. Cl. .......................... 228/115; 29/874; 29/882; 429/178

(58) Field of Classification Search ............... None
See application file for complete search history.

(56) References Cited

U.S. PATENT DOCUMENTS

| | | | |
|---|---|---|---|
| 1,338,462 A | 4/1920 | Rydeck | |
| 1,668,996 A | 5/1928 | Anderson | |
| 1,766,098 A | 6/1930 | Booth | |
| 1,994,178 A | 3/1935 | Raiche | |
| 2,372,011 A | 3/1945 | Remington et al. | |
| 2,392,175 A | 1/1946 | Norton | |
| 2,526,489 A | 10/1950 | Liddicoat | |
| 2,566,243 A | 8/1951 | Nyquist | |
| 2,966,987 A | 1/1961 | Kaul | |
| 2,978,932 A | 4/1961 | Frueauff | |
| 3,280,613 A | 10/1966 | Schröm | |
| 4,177,665 A | 12/1979 | Schurmann | |
| 4,197,772 A | 4/1980 | Anderson et al. | |
| 4,416,141 A | 11/1983 | Nippert | |
| 4,423,617 A | 1/1984 | Nippert | |
| 4,649,731 A | 3/1987 | Eisenmann | |
| 4,653,305 A | 3/1987 | Kanamaru et al. | |
| 4,776,197 A | 10/1988 | Scott | |
| 4,898,796 A | 2/1990 | Furukawa et al. | |
| 4,945,749 A | 8/1990 | Walker et al. | |
| 5,048,590 A | 9/1991 | Carter | |
| 5,077,892 A * | 1/1992 | Nugent | 29/874 |
| 5,296,317 A | 3/1994 | Ratte et al. | |
| 5,349,840 A * | 9/1994 | Ratte et al. | 72/327 |
| 5,373,720 A * | 12/1994 | Ratte et al. | 72/354.8 |
| 5,422,202 A * | 6/1995 | Spiegelberg et al. | 429/179 |
| 5,496,660 A * | 3/1996 | Stocchiero | 429/183 |
| 5,499,449 A * | 3/1996 | Carter et al. | 29/882 |
| 5,589,294 A | 12/1996 | Spiegelberg et al. | |
| 5,606,887 A | 3/1997 | Spiegelberg et al. | |
| 5,632,173 A | 5/1997 | Spiegelberg et al. | |
| 5,655,400 A | 8/1997 | Spiegelberg et al. | |
| 5,791,183 A * | 8/1998 | Spiegelberg et al. | 72/68 |
| 5,814,421 A * | 9/1998 | Spiegelberg et al. | 429/178 |
| 6,644,084 B1 * | 11/2003 | Spiegelberg | 72/126 |

(Continued)

*Primary Examiner*—Kiley Stoner
(74) *Attorney, Agent, or Firm*—Foley & Lardner LLP

(57) ABSTRACT

A method and apparatus for cold forming a battery terminal having a base and an insert. The insert includes a first portion encapsulated within the base and a second portion that extends beyond a first side of the base.

9 Claims, 8 Drawing Sheets

U.S. PATENT DOCUMENTS 6,902,095 B2 6/2005 Ratte et al.
7,021,101 B2 * 4/2006 Spiegelberg ................. 72/126

2002/0002772 A1 * 1/2002 Hirano et al. ................. 29/883
2005/0153202 A1 7/2005 Ratte et al.

* cited by examiner

COLD FORMED BATTERY TERMINAL

CROSS-REFERENCE TO RELATED PATENT APPLICATIONS

This application is a Continuation of U.S. application Ser. No. 10/162,059, filed Jun. 4, 2002 now U.S. Pat. No. 7,163,763 entitled "Cold Formed Battery Terminal" by Spiegelberg et al., incorporated herein by reference in its entirety. The Applicants have also filed concurrently herewith a Divisional Application having U.S. application Ser. No. 11/268,498, filed Nov. 8, 2005, claiming priority to U.S. application Ser. No. 10/162,059 filed Jun. 4, 2002.

BACKGROUND OF THE INVENTION

The present invention relates generally to the field of battery terminals, and more specifically, the invention relates to a cold formed battery terminal having a male or female insert and a method and apparatus for forming the cold formed terminal.

In general battery terminals are utilized as an interface between a sealed battery container and an external device seeking electrical power. The interface between the terminal may include a female member such as a nut or a male member such as a stud that is embedded in the terminal. In sealed batteries containing liquid electrolyte, the battery terminal must be configured to prevent leakage of electrolyte to ensure the battery will not fail prematurely when called upon. To prevent leakage of electrolyte around a battery terminal it is common to provide a plurality of annular acid rings extending around the head of the battery terminal, which is designed to be embedded in the wall of the container.

Some terminal configurations, such as a marine battery terminal may place the male or female interface offset from the radial rings.

Battery terminals including annular rings on the head are typically formed from lead in a cold or hot forming process. In the hot forming process, a lead alloy is heated until it is in a molten state. The molten lead is then poured into a mold or casting and formed into a partially-finished or finished battery terminal. In the cold forming process a lead slug (typically at room temperature) is subjected to various pressing, punching and machining operations to create the finished battery terminal.

As mentioned above, the hot forming process requires that the lead be heated until it reaches the molten state and then subsequently poured into a multi-part mold until it cools. This is disadvantageous in that melting the lead alloy may create undesirable porosity in the finished battery terminal and is expensive to implement in an environmentally safe manner. The hot forming process can be employed to embed a male or female insert into the terminal while the terminal is being formed. U.S. Pat. No. 5,589,294 entitled "Side Wall Electrical Battery Terminal" and granted on Dec. 31, 1996 and commonly assigned with the instant invention discloses a cold formed terminal having a nut encapsulated in a terminal.

It would be desirable to have a terminal that is cold formed and including both annular rings and a male interface embedded in the terminal. It would also be desirable for the annular rings of the cold formed terminal to be offset from the embedded male or female insert.

SUMMARY OF THE INVENTION

One embodiment of the invention relates to a cold formed battery terminal comprising a base cold formed from lead and including an insert having a first portion encapsulated within the base and a second portion extending beyond a first side of the base.

Another aspect of the invention relates to a method for manufacturing a cold formed battery terminal including cold forming a lead slug into a member having a base and a first aperture extending therein. The method further includes placing an insert having a head and longitudinal member into the aperture and encapsulating the head within the base.

A still further aspect of the invention relates to a method of cold forming a battery terminal, comprising cold forming a lead slug into a first partial terminal including a base having a first side and an opposing second side. An aperture extends in the base proximate the first side, and a second aperture extends in the base proximate the second side. The first and second apertures are separated by a first wall. The first wall is removed from the first partial terminal forming a first through hole therein. An insert having a head and an extension member is placed within the first through hole with the head being located within the base, and the extension member extending beyond the base above the first side of the base. The head is encapsulated within the base by cold forming the partial terminal to substantially close the through hole proximate the second side. The first partial terminal is cold formed into a second partial terminal including a second extension having at least one acid ring proximate the second side of the base. A through hole is punched in the recess extending through the base.

In another aspect of the invention, a method of seating an insert into a battery terminal comprises, providing a terminal including a recess having a beveled portion with a predetermined diameter; and providing an insert including a head having a diameter greater than the predetermined diameter of the recess portion; and further forcing the head of the insert within the recess, displacing material within beveled portion of the recess to frictionally engage the head within the recess.

In still another aspect of the invention an apparatus for cold forming a battery terminal comprises a first stamping station having a first die configured to cold form a lead slug into a partially formed terminal having a base having a first recess. The apparatus includes a second stamping station having a second die to cold form the partially formed terminal into a battery terminal including an extension having a second recess.

DETAILED DESCRIPTION OF THE PREFERRED EMBODIMENTS

Figure 1:
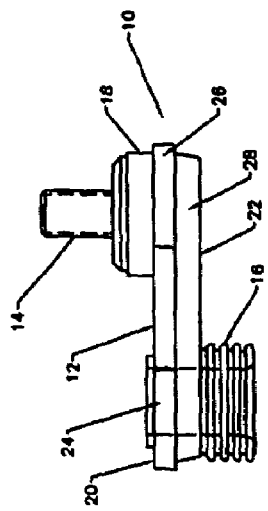
FIG. 1 is a cold formed terminal having an embedded insert.

Referring to FIG. 1, a cold formed terminal 10 includes a base 12, an insert 14 and a plurality of acid rings 16. In one embodiment, the insert 14 is a male insert embedded in a raised extension 18, and extends above a first side 20 of the base 12. The rings 16 extend from the second side 22 of the base in a direction opposite the raised extension 18. The terminal includes a through hole 24 extending through the base and the acid rings 16. In one embodiment, the insert 14 is a hex bolt. However, the insert could be other types of extensions, such as a round bar, a non circular stud, or even an internal threaded insert such as nut or other female receptor for connecting another member. The radial axis of the insert 14 is offset from the radial axis of the acid rings 16. The base 12 further includes a top region 26 and a bottom region 28.

Figure 2:
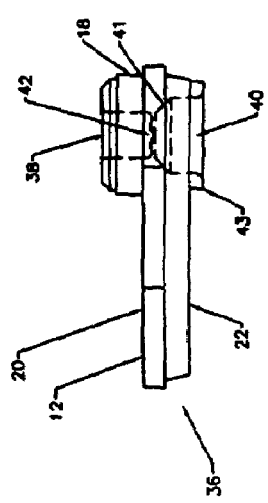
FIG. 2 is the partially cold formed terminal after a first operation.
Figure 8:
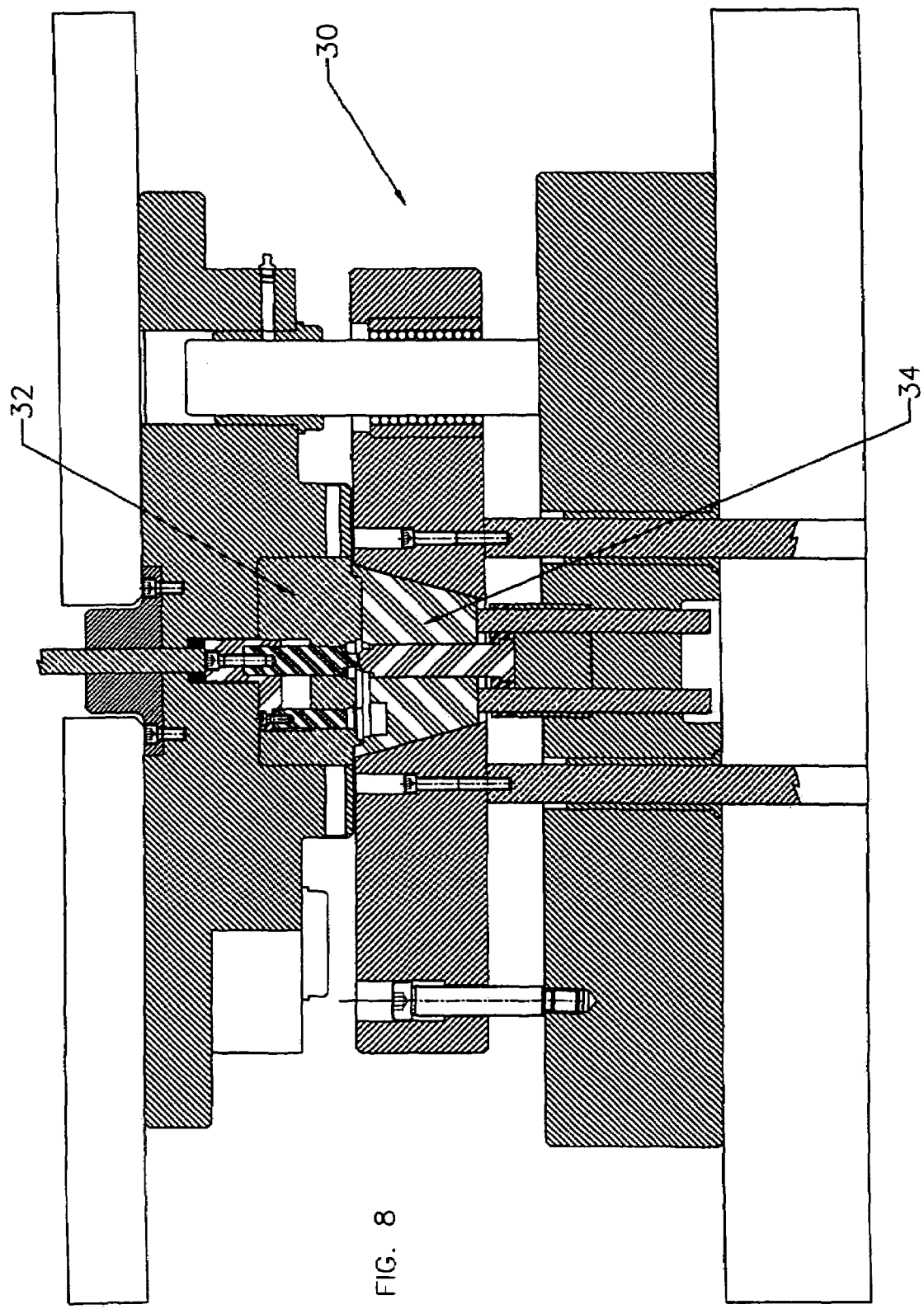
FIG. 8 is a schematic illustration of the die used in the first operation.

Referring to FIG. 2 and FIG. 8 the first operation of forming the cold formed terminal 10 begins with a single cylindrical lead slug. In one embodiment, the slug has a diameter of 0.855 inches. The slug is placed in a first die station 30 between an upper die 32 and a lower die 34. The cylindrical slug is cold formed or forged into a first partially formed terminal 36 having a first extension 18 provided with a recess 38 extending therein toward the base 12. A second co-axial recess 40 extends upward from the second side 22 of base 12 of the first partially formed terminal. The first recess 38 and second recess 40 are separated by a first plug 42. The second recess 40 includes an upper region 41 having a beveled wall terminating at plug 42. Surrounding the second recess 40 on the second side 22 of base 12 is a bottom extension 43 that will be used to seal the insert 14.

Figure 3:
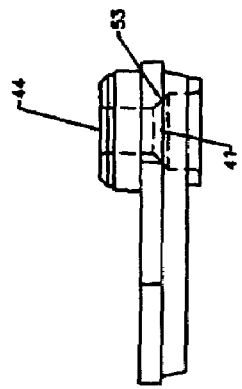
FIG. 3 is the partially cold formed terminal after a second operation.

Referring to FIG. 3, in the second operation, the first partially formed terminal 36 is moved to a punching station in either a stand alone punch or in a second station in a progressive die. A punch removes the plug 42 thereby providing a through hole 44 between the first recess 38 and second recess 40.

Figure 4:
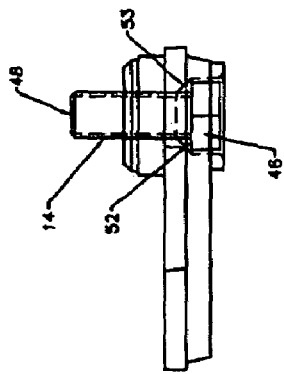
FIG. 4 is the partially cold formed terminal after a third operation.

Referring to FIG. 4, in a third operation, the male insert or stud 14 having a head 46 is inserted within through hole 44, such that head 46 is located within second recess 40, and an end portion 48 of stud 14 extends through hole 44 and above raised extension 18.

Figure 5:
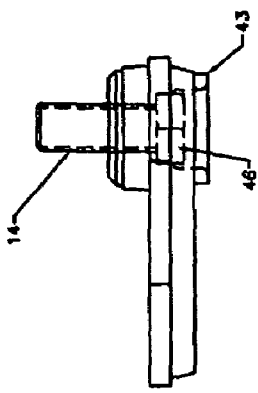
FIG. 5 is the partially cold formed terminal after a fourth operation.
Figure 9:
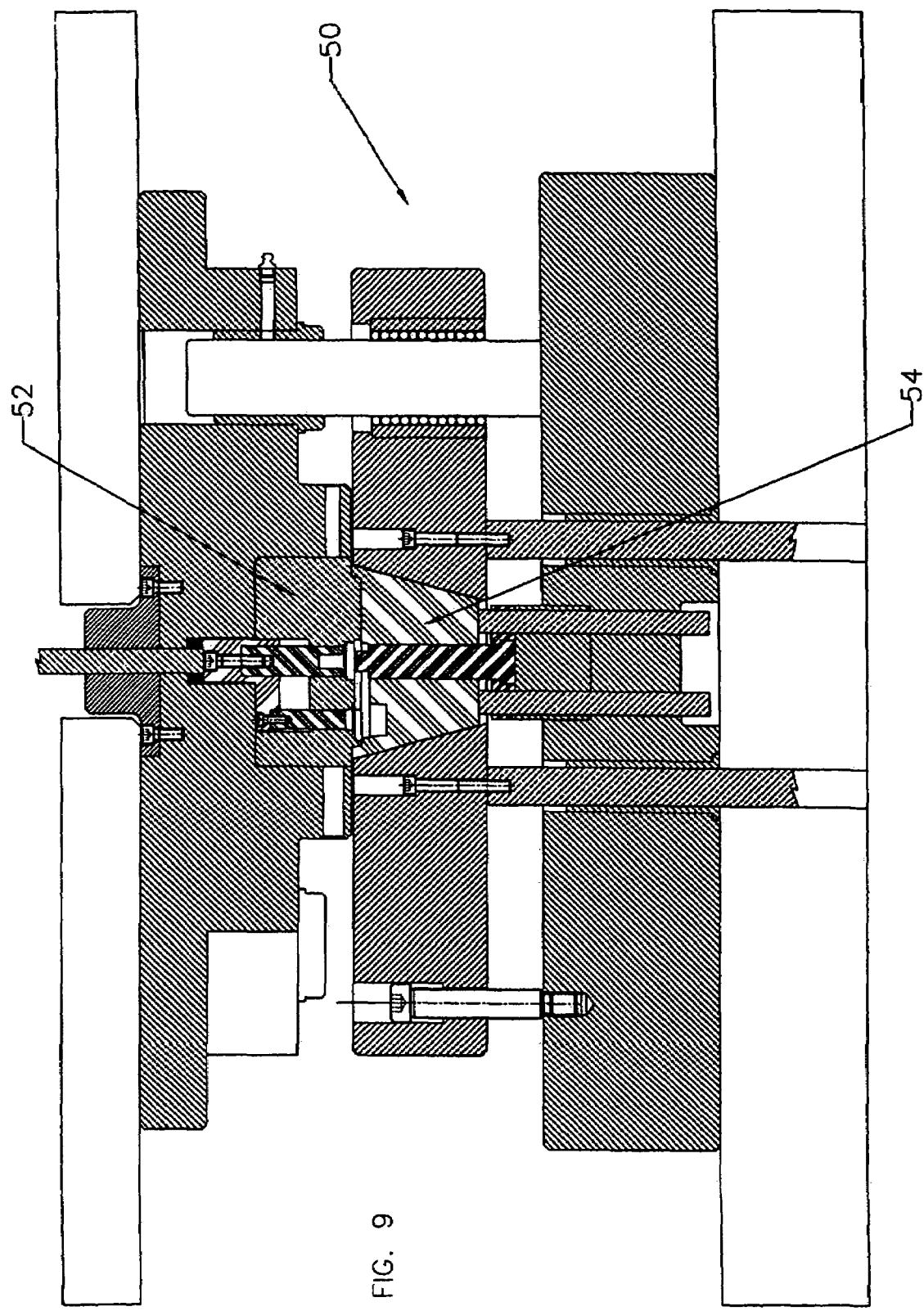
FIG. 9 is a schematic illustration of the die used in the fourth operation.

Referring to FIG. 5 and 9, the male insert 14 is pressed into through hole 44 in a fourth die station 50 between upper die 52 and a lower die 54. The first side 52 of head 46 is seated within the upper region 41 of second recess 40. As the head 46 is seated within through hole 44, the beveled walls 53 of upper region 41 flow around the outer periphery of the head 46.

Figure 6:
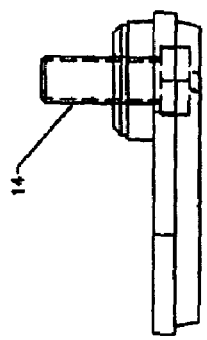
FIG. 6 is the partially cold formed terminal after a fifth operation.
Figure 10:
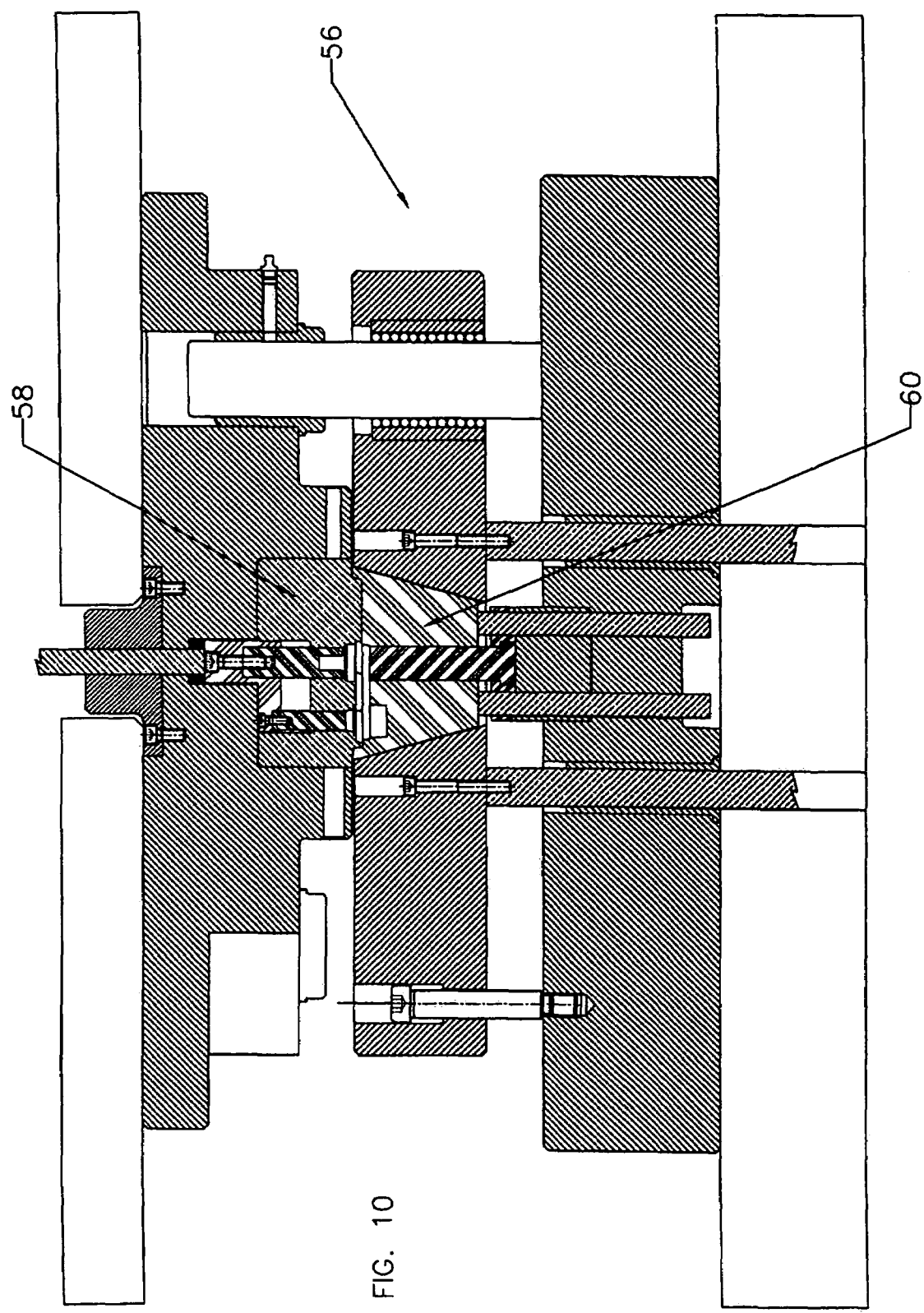
FIG. 10 is a schematic illustration of the die used in the fifth operation.

Referring to FIGS. 6 and 10, the bottom extension 43 is forged into lower recess 40 to seal the head 46 of insert 14 within the base 12. The flow of the bottom extension 43 into the recess 40 is accomplished in the fifth die station 56 with an upper die 58 and a lower die 60. This fifth operation substantially seals the insert within the through hole 44. As a result of the of the fifth die station through hole 44 is substantially closed proximate the head 46.

Figure 7:
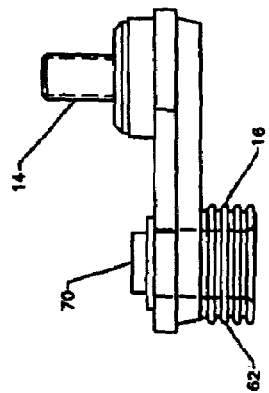
FIG. 7 is the partially cold formed terminal after a sixth operation.
Figure 11:
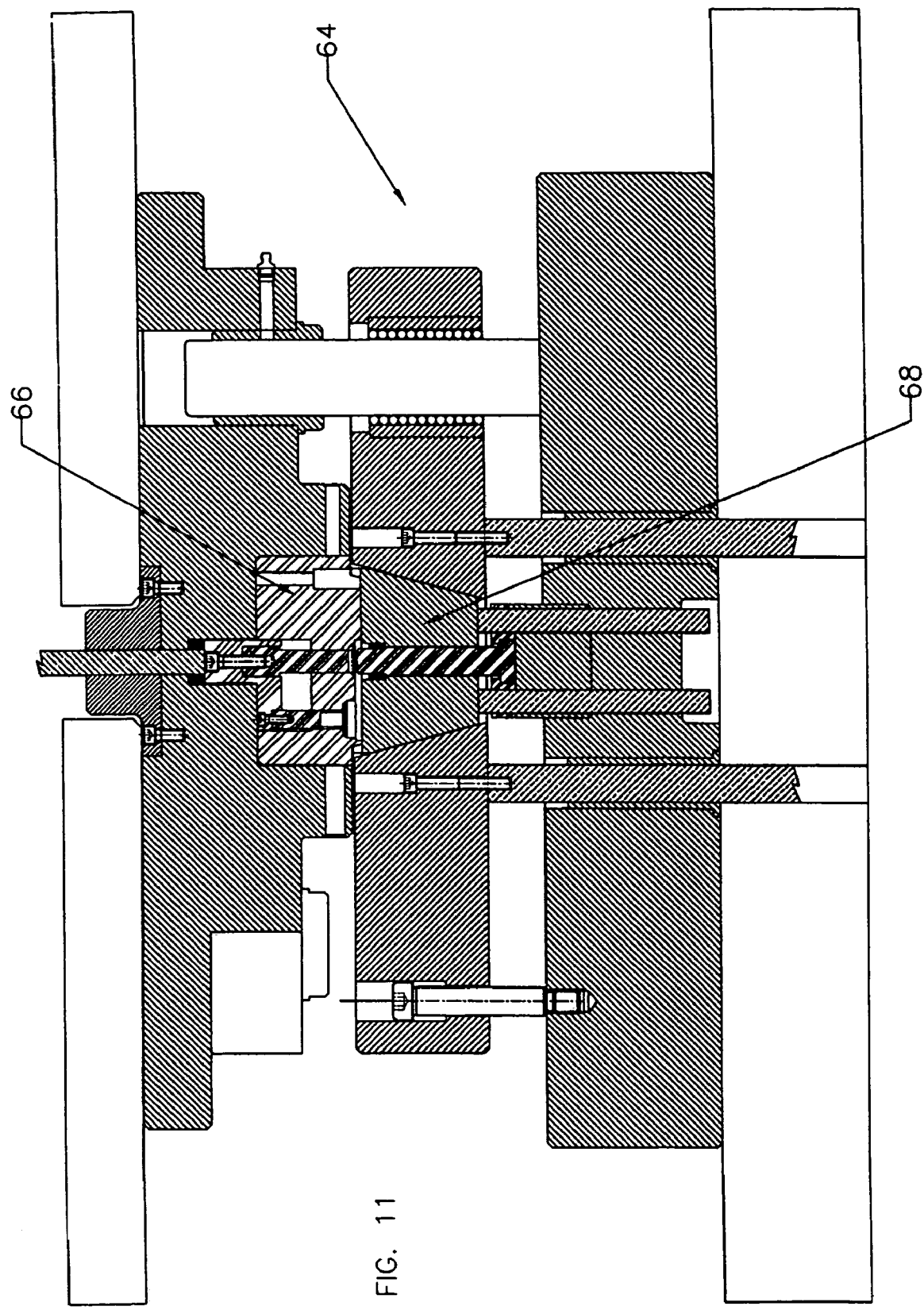
FIG. 11 is a schematic illustration of the die used in the sixth operation.

A plurality of acid rings 16 are formed on a lower extension 62 in a sixth operation. Referring to FIG. 11 a sixth die station 64 includes an upper die 66 and a lower split die 68. The orientation of the terminal is reversed in the sixth die station such that the center of the upper die 66 is co-axial with the axis of the acid rings and offset from the longitudinal axis of the insert. As illustrated in FIG. 7, the longitudinal axis of extension 62 is offset from longitudinal axis of the insert. Additionally, the lower extension 62 and acid rings 16 are located on the second side 22 of the base 12 which is opposite of the insert 14. The lower extension 62 includes an internal upper plug 70 proximate the first side 20 of the base 12.

In a seventh operation, the upper plug 70 is punched from the lower extension 62 to form a through hole 24. The resultant terminal 10 is illustrated in FIG. 1.

The seven operations outlined above, may all take place in seven separate stations. However, the seven operations may be formed with a single progressive die. Alternatively, any combination of operations may be combined in a single press. In the preferred embodiment, a single progressive die is employed. Each operation outlined above would be located on a single die system, such that a pick and place robot would move each component simultaneously to the next station. For example, a first pick and place robot or vibratory delivery mechanism would present the cylindrical lead slug to the first die station 30. Once the first operation was complete, the processed slug would be moved from the first die station 30 to a second die station. A lower die in the second die station supports the bottom 22 of the component, and a punch would be lowered simultaneously, with the processing of a new cylindrical lead slug in the first die station 30.

A pick and place mechanism could move each component individually or simultaneously. Once the forged and punched terminal is moved to the third die station, an insert 14 is located within lower recess 40. In the fourth die station 50, the component is pressed between dies 52 and 54 to fully seat the head 46 of insert 14 within recess 40.

Once the insert is fully seated within lower recess 40, the component is moved to the fifth die station 56 and located between an upper die 58 and lower die 60. When the press is activated, the bottom extension 43 is forged such that the material that constitutes bottom extension 43 fills in the recess 40 and seals the head 46 of insert 14 to the base 12.

The component from the fifth operation is then moved to the sixth operation simultaneously with all of the other processed components. The orientation of the component is rotated one hundred and eighty degrees so that the insert is no longer in the center of the sixth die station but is offset from the longitudinal axis of the split lower die 68. This new orientation permits acid rings 16 to be formed during the cycle of the press.

Once the acid rings 16 have been formed in the split die 68, the nearly formed terminal is transferred to the final seventh operation in which the plug 70 is removed forming a hole through the base and the bottom extension with the external acid rings.

The simultaneous processing of the terminals reduce the number of presses required and ensure that all of the components are being processed at the same rate. Some or all of the steps can be included in a single press with an upper and lower set of dies. A transfer mechanism may be employed to move the components to each successive station.

Figure 15:
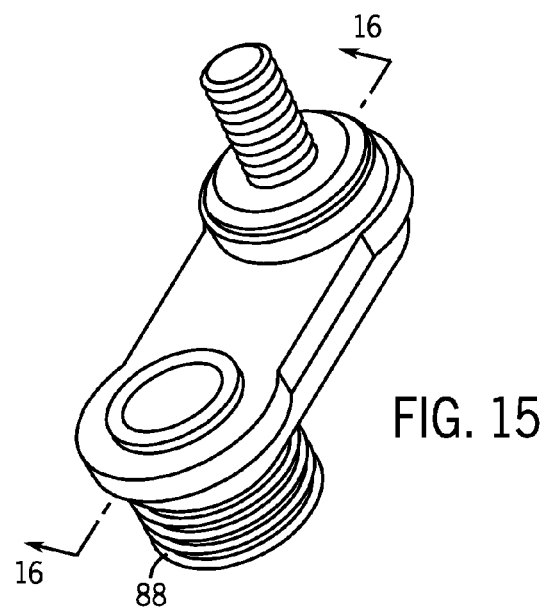
FIG. 15 is an isometric view of a cold formed terminal with under cut acid rings.
Figure 16:
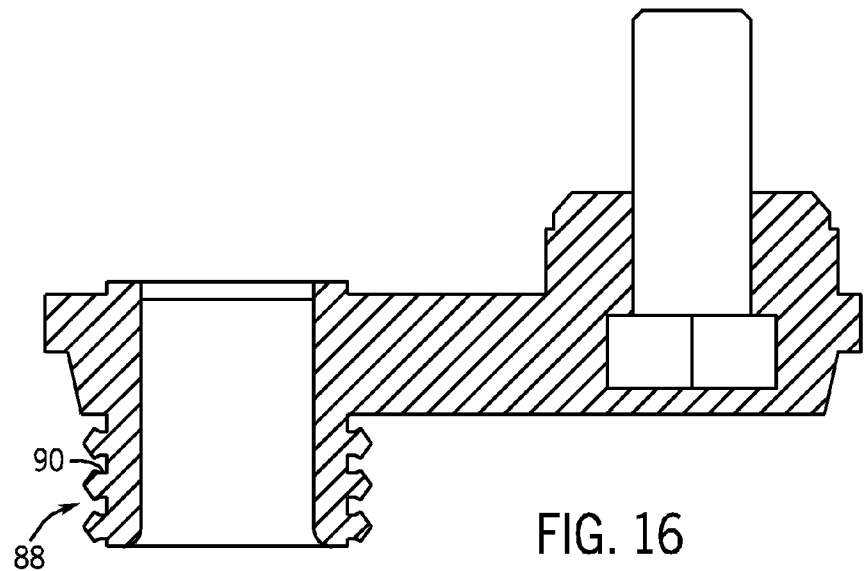
FIG. 16 is a cross section taken generally along lines 16-16 of FIG. 15.

As illustrated in FIGS. 15 and 16, the finished terminal may include radial rings 88 having an undercut 90. The undercut 90 may be formed by the apparatus and process outlined in co-pending U.S. patent application Ser. No. 09/881,261 Method and Apparatus for Manufacturing a Battery Terminal with Undercut Rings filed Jun. 14, 2001 and incorporated herein by reference.

Figure 17:
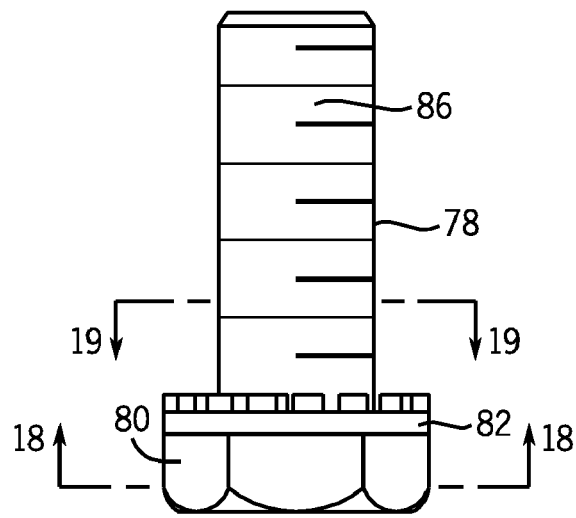
FIG. 17 is an isometric view of an exemplary insert.
Figure 18:
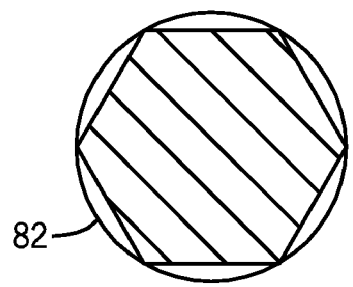
FIG. 18 is a cross section taken generally along lines 18-18 of FIG. 17.
Figure 19:
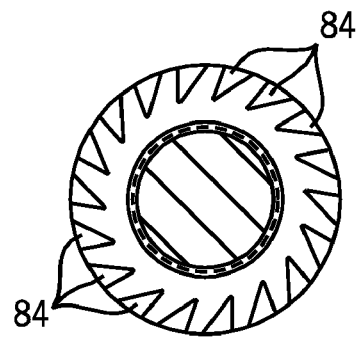
FIG. 19 is a cross section taken generally along lines 19-19 of FIG. 17.

Referring to FIG. 17, one exemplary embodiment of insert 14 includes a threaded extension 78 and a hex shaped head 80. An insert axis 86 is defined as the axis extending along the length of the extension 78. In order to minimize the possibility of the insert from being stripped from the base in the direction of the insert axis, a flange 82 is added to the hex shaped head 80. Flange 82 adds additional surface area that is encapsulated within the base of the terminal to resist movement of the insert in the insert axis direction. Additionally, serrations 84 may be added to the head 80 and/or to flange 82 to prevent rotation of the insert about its axis. In one embodiment, the serrations 84 are curved to prevent clockwise rotation of the bolt. This resists rotation of the insert as a clamp is being applied to the extension member. Of course the serrations 84 could be curved in the opposite direction if counter-clockwise rotation was to be prevented. Alternatively, serration could be added that would prevent rotation in both directions. Other type of indentations about the periphery of the head are also contemplated to avoid rotation of the insert within the lead base. Further, indentations may be located on the terminal end of the head or on the portion of the head proximate the extension.

Figure 12:
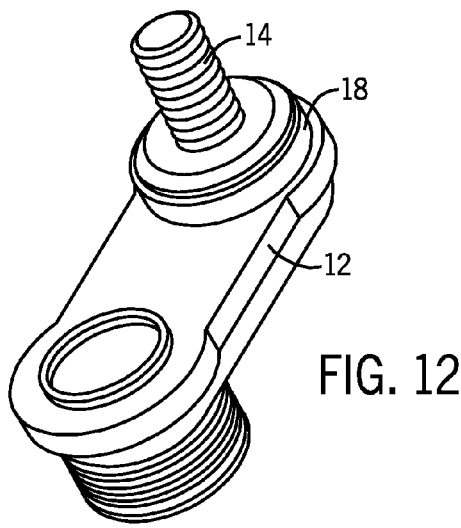
FIG. 12 is an isometric view of the cold formed terminal.
Figure 13:
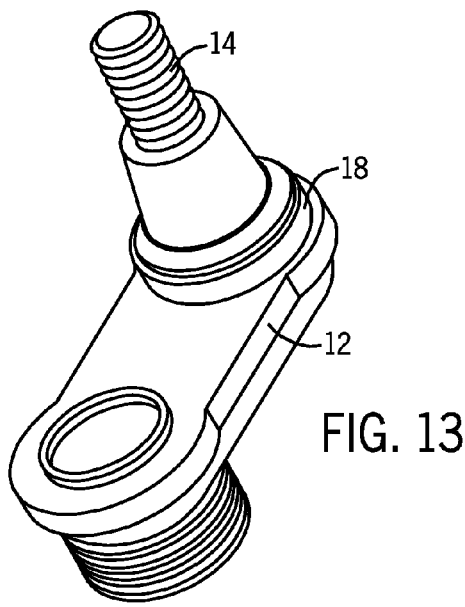
FIG. 13 is an isometric view of another cold formed terminal.
Figure 14:
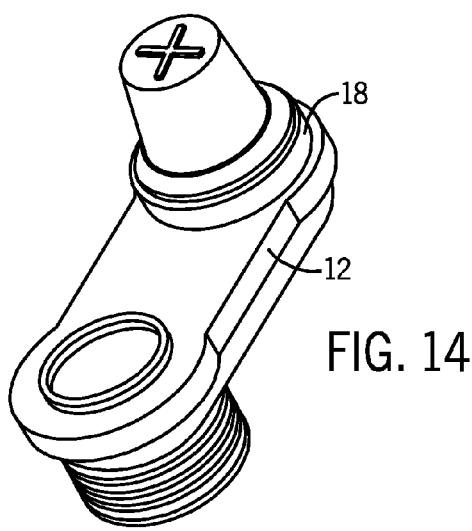
FIG. 14 is an isometric view of yet another cold formed terminal.

Although the invention has been described in conjunction with specific embodiments thereof, it is evident that alternatives, modifications and variations will be apparent to those skilled in the art. For example as illustrated in FIGS. 13 and 14, a battery terminal may be formed in which the first extension extends a greater distance from the base, then the extension of FIG. 12. Additionally, the insert may not extend beyond the first extension as illustrated in FIG. 14 or may be done away with altogether. It is intended that the claims embrace these and other alternatives, modifications and variations which fall within the spirit and scope of the appended claims.

What is claimed is:

1. A method of cold forming a finished battery terminal comprising:
    cold forming a lead or lead alloy slug to form a stop and a chamber with a chamber opening therein;
    inserting a male fastener having a head and a shank in the chamber of the slug until the shank extends out of the chamber opening in the slug and the head of the fastener is in retained engagement with a shoulder; and
    cold forming the slug with the fastener head therein until the fastener head is embedded in the slug.

2. The method of claim 1 including the step of cold forming an annular fill-in lip around the chamber opening.

3. The method of claim 2 including the step of cold forming the annular lip radially and laterally into the chamber to encapsulate the fastener head therein.

4. The method of claim 1 including the step of inserting the fastener into the chamber until a fastener end face is beyond a plane extending through an exterior surface of the battery terminal.

5. The method of claim 4 including the step of forming a further chamber with an annular extension extending around an opening into the further chamber.

6. The method of claim 5 including the step of forming a set of concentric acid rings in the annular extension around the offset opening.

7. The method of claim 1 including the step of cold forming an extension for carrying a portion of the chamber and the opening on a top face of the battery terminal and for cold forming an extension for carrying acid rings on a bottom face of the slug.

8. The method of claim 1 wherein the step of placing a male fastener in the opening comprises placing a bolt in the battery terminal.

9. The method of claim 1 including the step of inserting the male fastener comprises placing the male fastener with a protrusion thereon and cold forming the lead or lead slug alloy until the cold formed lead engages the protrusion to prevent rotation of the metal fastener as the fastener is secured to an external female connector.

* * * * *